United States Patent [19]
Anai et al.

[11] Patent Number: 6,008,789
[45] Date of Patent: Dec. 28, 1999

[54] IMAGE DISPLAY METHOD AND DEVICE

[75] Inventors: Kimio Anai; Yasuyuki Onda, both of Hyogo-ken, Japan

[73] Assignee: Kabushiki Kaisha Toshiba, Kawasaki, Japan

[21] Appl. No.: 08/925,481

[22] Filed: Sep. 8, 1997

[30] Foreign Application Priority Data

Sep. 11, 1996 [JP] Japan ..................................... 8-240317
Aug. 25, 1997 [JP] Japan ..................................... 8-227656

[51] Int. Cl.$^6$ ....................................................... G09G 3/36
[52] U.S. Cl. .............................. 345/99; 345/127; 345/212
[58] Field of Search ................................ 345/98, 99, 100, 345/127, 211, 212, 213; 348/445, 634

[56] References Cited

U.S. PATENT DOCUMENTS

| | | | |
|---|---|---|---|
| 5,471,251 | 11/1995 | Inaba et al. | 348/634 |
| 5,600,347 | 2/1997 | Thompson et al. | 345/127 |
| 5,619,225 | 4/1997 | Hashimoto | 345/98 |
| 5,764,297 | 6/1998 | Sengoku | 348/445 |

FOREIGN PATENT DOCUMENTS 8-289232  11/1996  Japan .

Primary Examiner—Xiao Wu
Attorney, Agent, or Firm—Oblon, Spivak, McClelland, Maier & Neustadt, P.C.

[57] ABSTRACT

A method of displaying an image on a display screen and a image display device are described. The display device includes a display screen, horizontal and vertical scanning circuits, and a control circuit. The display screen has a predetermined aspect ratio of its lateral axis length and its longitudinal axis length. The horizontal scanning circuits derive signal voltages from a video signal in accordance with a clock signal and provide the same to pixels of horizontal pixel lines. The vertical scanning circuits select the horizontal pixel lines. The control circuit includes a divider circuit to divide a reference clock signal by first and second dividing ratios, and a switching circuit to select either a combination of the reference clock signal and an output signal of the divider circuit by the first dividing ratio or an output of the divider circuit divided by the second dividing ratio so that it may supply the clock signal to the horizontal scanning circuit.

14 Claims, 11 Drawing Sheets

| CONTROL SIGNAL | | HORIZONTAL CLOCK SIGNAL FREQUENCY |
|---|---|---|
| B | C | |
| L | L | $f_{CK}/3$ |
| L | H | |
| H | L | $f_{CK}$ |
| H | H | $f_{CK}/2$ |

DISPLAY REGION A   DISPLAY REGION B

DISPLAY REGION A   DISPLAY REGION B

IMAGE DISPLAY METHOD AND DEVICE

BACKGROUND OF THE INVENTION

1. Field of the Invention

This invention relates to an image display method and a device for displaying different aspect ratio images on one screen by sampling input video signals sequentially.

2. Related Art

Since a liquid crystal display device, which is a typical example of an image display apparatus, has such advantageous features as thinness, light weight and low power consumption, it has many applications in personal computers, wordprocessors, television receivers, car navigation devices, projection type display apparatus and the like. An active matrix type liquid crystal display device, above all, has a transistor switching element for each pixel to realize a good quality image without cross-talk between neighboring pixels so that vigorous research and development thereof are still carried out.

The effective display area of a conventional display device has the aspect ratio of 4/3 which is defined by its lateral axis length to its longitudinal axis length. In recent years, however, many display devices have the aspect ratio of 16/9 which effective display are is extended in the horizontal scanning direction and is visually recognized to be large.

There are several known methods of displaying an image with the aspect ratio of 4/3 on the effective display area of a liquid crystal display device with that of 16/9.

According to a first display method, a video signal with the aspect ratio of 4/3, as shown in FIG. 13(a), is sampled sequentially in response to a sampling clock signal to display an image entirely with the aspect ratio of 16/9 as shown in FIG. 13 (b). This method does not require any specific circuit but the original video with the aspect ratio of 4/3 cannot be faithfully reconstructed because the displayed image is deformed in the horizontal scanning direction as schematically shown in 13(b).

A second display method is, as shown in FIG. 13(c) or 13(d), to divide an effective display area with the aspect ratio 16/9 into one with that of 4/9 and another with that of 12/9 (=4/3) where a video signal consisting of an image information with the aspect ratio of 4/3 is displayed.

In this case, however, it is necessary to allocate at least 0.8 H to the display area with the aspect ratio of 12/9 for the sampling period of each horizontal scanning line where H is one NTSC horizontal scanning period and 0.2 H or less to the display area with the aspect ratio of 4/9 for the remaining sampling period. To comply with this requirement, sequential sampling and display are performed based on a video signal which is processed in advance by using frame memories. It does not achieve a less expensive display device of this sort primarily because the frame memories are relatively expensive.

A third display method is described in a Japanese Unexamined Patent Publication (Tokkai Hei) 8-289232. This method is to divide the effective display area with the aspect ratio of 16/9 into two areas, i.e., one with that of 4/9 and another with that of 4/3, and to set sampling clock signals with different frequencies from each other.

In more detail, the frequency of the first sampling clock signal is "3fCK/4" while that of the second "3fCK/2" in the case of the frequency "fCK" of a sampling clock signal used for displaying a video signal with the aspect ratio of 16/9 on the effective display area with that of 16/9.

In order to generate those sampling clock signals, as shown in FIG. 14, a sampling clock generator includes a voltage controlled oscillator VCO, frequency dividers, a phased lock loop PLL with a horizontal synchronous signal input terminal, and a switching circuit SW.

Since the voltage controlled oscillator generates a reference signal with a quite high frequency, it is influenced by outer circuits so easily as to causes various disadvantages in which, for instance, sampling clock signals become unstable, its power consumption increases, and it also generates spurious electromagnetic waves.

SUMMARY OF THE INVENTION

This invention overcomes such technical problems and its object is to provide a less expensive, high accuracy method and apparatus for displaying image information on a display screen in such a way that the aspect ratio for the image information is different from that for the display screen.

This invention is applied to an image display device which includes a plurality of display pixels to form a plurality of horizontal pixel lines, a display screen with a predetermined aspect ratio, a horizontal scanning circuit to derive out signal voltages in accordance with a sampling clock signal and supply the same to the display pixels in the horizontal pixel line, a vertical scanning circuit to select the horizontal scanning lines, and a controller to supply the sampling clock signals to the horizontal scanning circuit.

An image display device of the present invention is primarily directed to the control circuit which is provided with a divider circuit to multiply a reference clock signal by first and second dividing ratios, and a selector circuit to select either a combination of the reference clock signal and a first output multiplied by the first dividing ratio at the divider circuit within one horizontal scanning period or a second output multiplied by the second dividing ratio at the divider circuit.

An image display method of the present invention performs multiplying a reference clock signal by first and second dividing ratios, selecting either a combination of the reference clock signal and a first output multiplied by the first dividing ratio within one horizontal scanning period or a second output multiplied by the second dividing ratio, displaying an image derived from a video input signal on a display screen including display pixels to form horizontal pixel lines in response to a clock signal.

According to the invention, a less expensive, high accuracy image display method and apparatus for displaying image information on a screen, the aspect ratio of which is different from that of the image information.

DESCRIPTION OF THE PREFERRED EMBODIMENT

A liquid crystal display device of the present embodiment will be explained hereinbelow with reference to the attached drawings.

Figure 1:
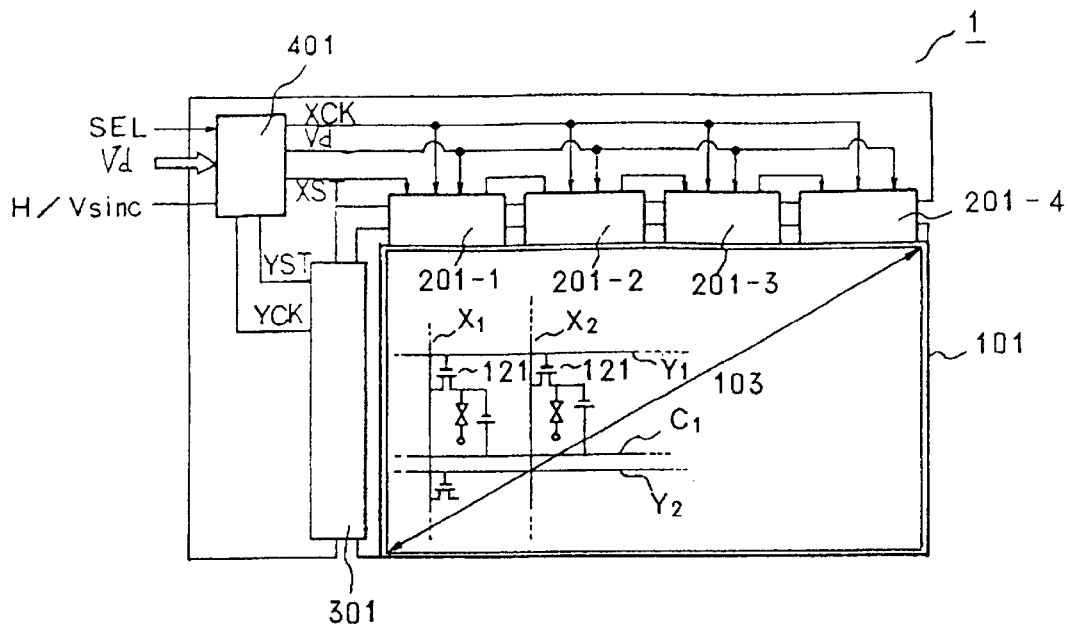
FIG. 1 is a schematic diagram to show a liquid crystal display device of one embodiment of the present invention.
Figure 13A:
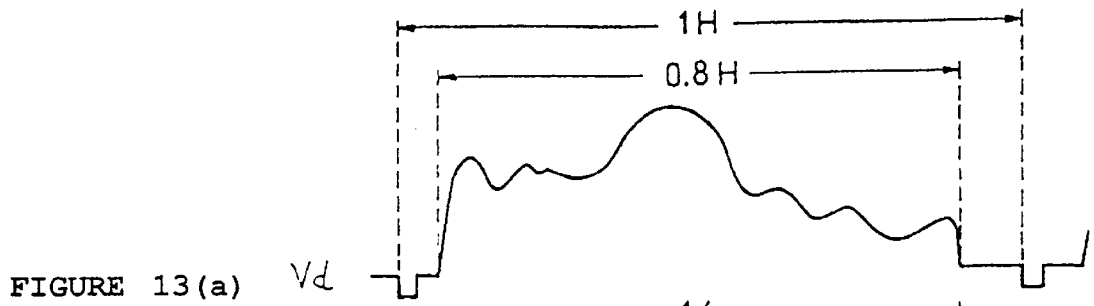
FIG. 13(a) through 13(d) are diagrams to describe various display forms.
Figure 13B:
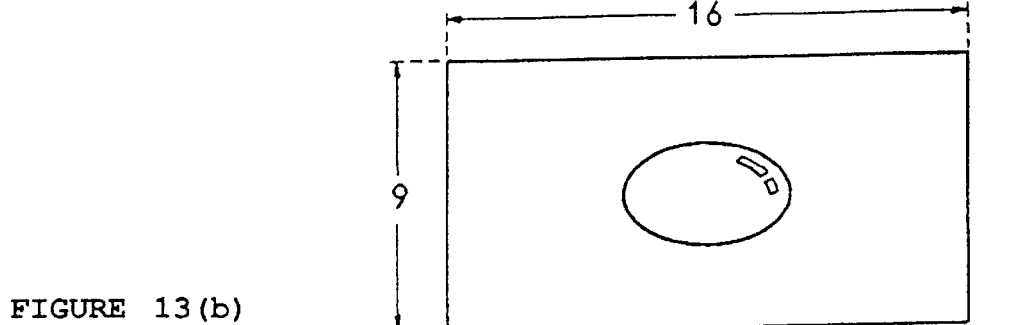
Figure 13C:
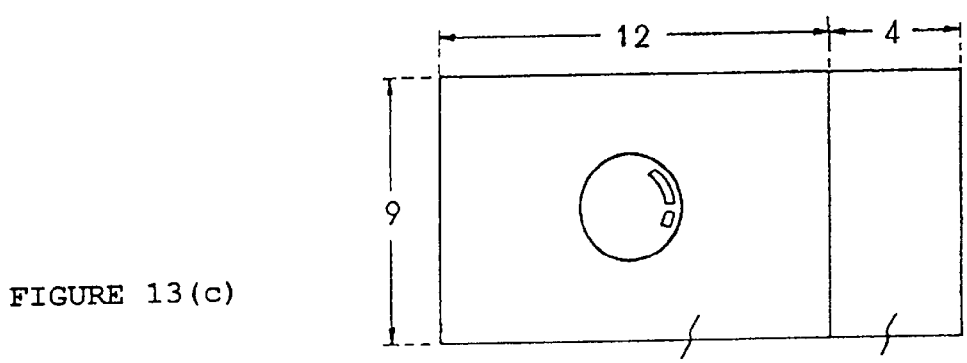
Figure 13D:
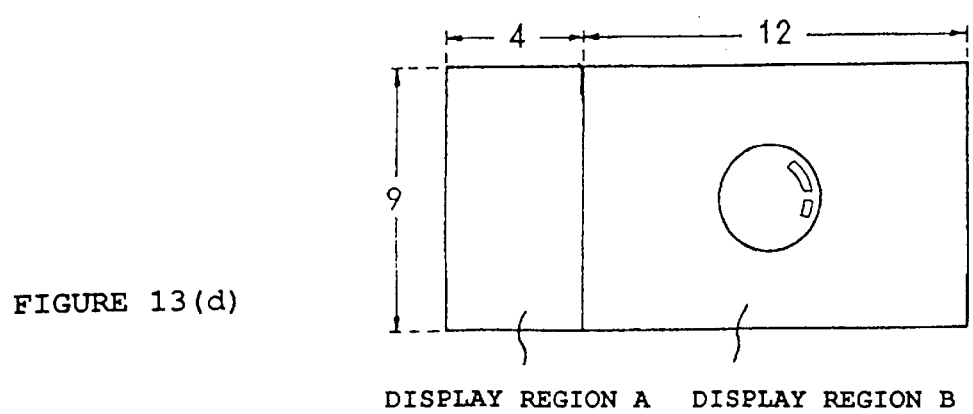
Figure 14:
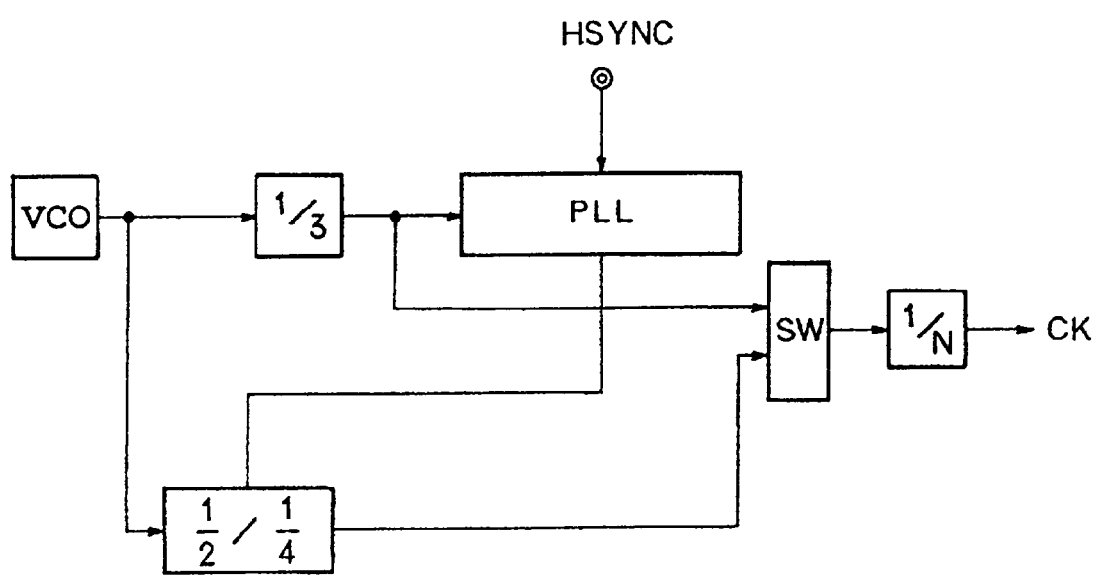
FIG. 14 is a circuit diagram of a conventional horizontal clock signal generator.

The liquid crystal display device 1, as shown in FIG. 1, is provided with an effective display area 103 which is of 6 inches diagonal length and the aspect ratio of 16/9, and performs either one of display forms shown in FIGS. 13(b) and 13(c) in response to an NTSC video signal "Vd".

The liquid crystal display device 1 further includes a liquid crystal display panel 101, 4 X-driver circuits 201-1 through 201-4 electrically connected to the liquid crystal panel 101 to sample the video signal "Vd", a Y-driver circuit 301, and a control circuit 401.

Figure 2:
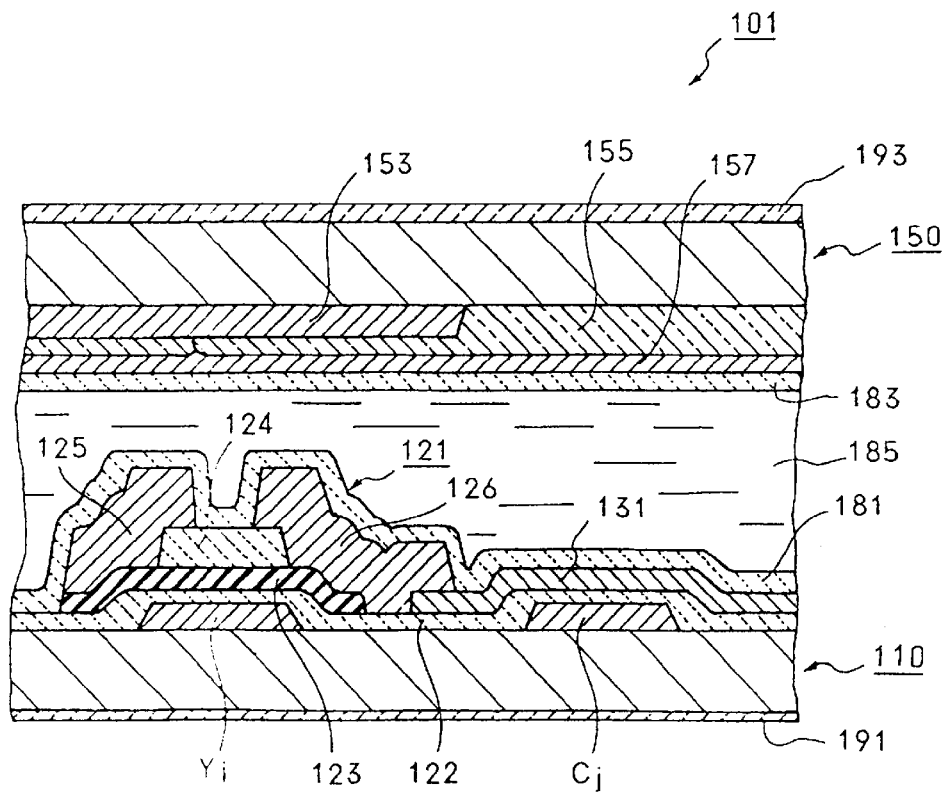
FIG. 2 is a sectional view of a part of a liquid crystal display panel shown in FIG. 1.

As shown in FIGS. 1 and 2, the liquid crystal display panel 101 has a thin film transistor (called "a TFT") array and counter substrates 110 and 150 between which a twisted nematic liquid crystal layer 185 is held and the peripheral edges of which are hermetically sealed up by a sealing material (not shown). On the outer surfaces of the substrates 110 and 150, polarizers 191 and 193 are disposed in such a manner that the polarization axes cross at right angles each other. The array substrate 110 has 480×3 signal lines Xi, (i=1, 2, 3, . . . , 1440), and 240 scanning lines Yj, (j=1, 2, 3, . . . , 240) which cross substantially in right angles with the signal lines Xi. In the vicinity of the cross point between each signal line Xi and each scanning line Yj, an inverted staggered type thin film transistor is provided with a gate line of part of the scanning line Yj, an active layer 123 of an amorphous silicon thin film formed on a gate insulation layer 122, a channel protection layer 124 formed on the active layer 123, a drain electrode 125 connected to the active layer 123 and the signal line Xi, and a source electrode 126 connected to the active layer 123. The source electrode 126 of the TFT 121 is also connected to an indium tin oxide (ITO) pixel electrode 131. The array substrate 110 is provided with storage capacitor lines Cj, (j=1, 2, 3, . . . , 240) running in parallel with the scanning lines Yj and overlapped with part of the pixel electrodes 131. The pixel electrode 131 and the storage capacitor line Cj define a storage capacitor Cs. The counter substrate 150 includes light locking layers 153 disposed in a matrix form to block light passing through the gaps defined between the signal line Xi and the pixel electrodes 131, and the gaps between the scanning lines Yj and the pixel electrodes 131, respectively, and a color filter layer 155 consisting of red (R), green (G) and blue (B) components, each of which is provided between the light blocking layers 153 formed on the color filter layers 155, and ITO counter electrodes 157.

The display area 103 of the liquid crystal panel 101 includes 240 horizontal pixel lines, each of which has 480 picture elements. Further, each picture element contains display pixels of red (R), green (G), and blue (B).

The control circuit 401 supplies a horizontal clock signals "XCK", a horizontal start signal "XST", and the video signal "Vd" to the X-driver circuits 201-1 through 201-4, and a vertical clock signal "YCK", and does also a vertical start signal "YST" to the Y-driver circuits.

Figure 3:
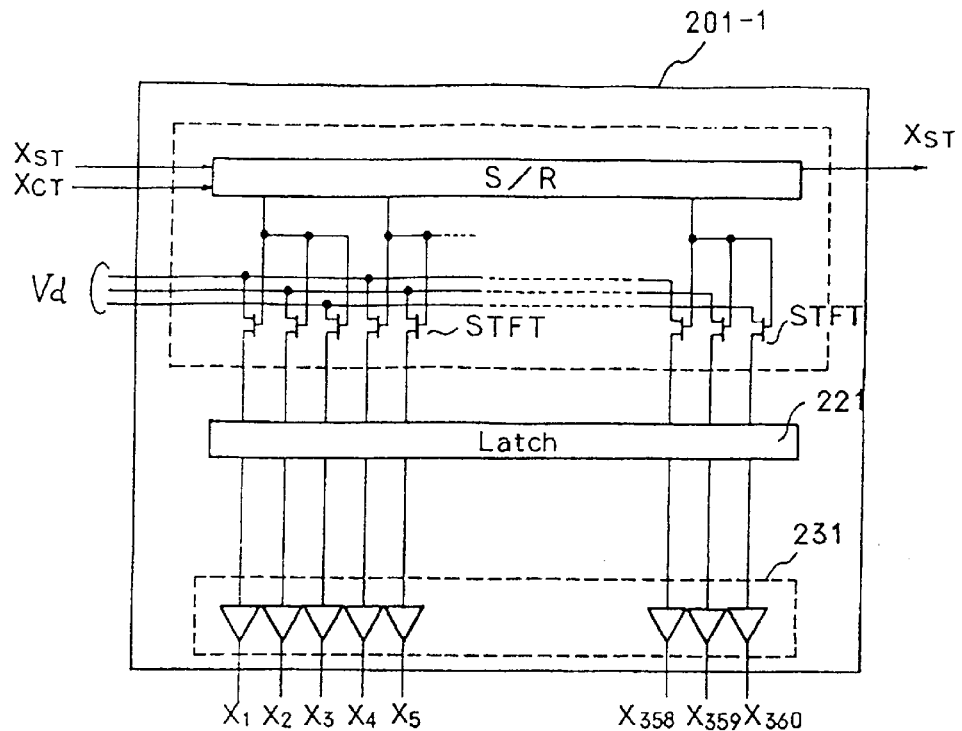
FIG. 3 is a circuit diagram of an X-driver unit shown in FIG. 1.

The X-driver circuit 201-1 includes, as shown in FIG. 3, a shift register S/R consisting of 120 flip-flop circuits to transfer the horizontal start signal "XST"sequentially in response to the horizontal clock signal "XCK", sampling circuits 211 including sampling transistors STFT to sample the video signal "Vd" in accordance with outputs of the shift register S/R, and latch and buffer circuits 221 and 231 to hold video signal voltages "Vsig" sampled through the sampling circuits 211. The other X-driver circuits 201-2 through 201-4 are substantially the same in construction and the explanation thereof is therefore omitted.

Figure 4:
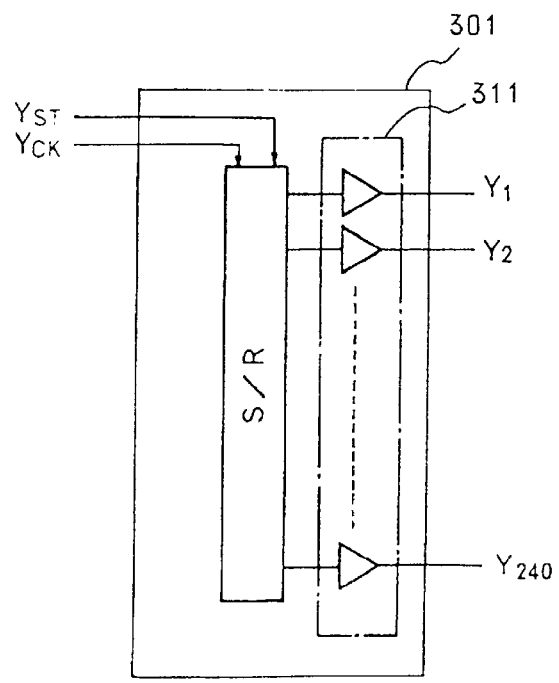
FIG. 4 is a circuit diagram of a Y-driver unit shown in FIG. 1.

The Y-driver circuit 301 has, as shown in FIG. 4, a shift register S/R consisting of 240 flip-flop circuits to transfer the vertical start signal "YST" sequentially in response to the vertical clock signal "YCK", and a buffer circuit 311.

Figure 5:
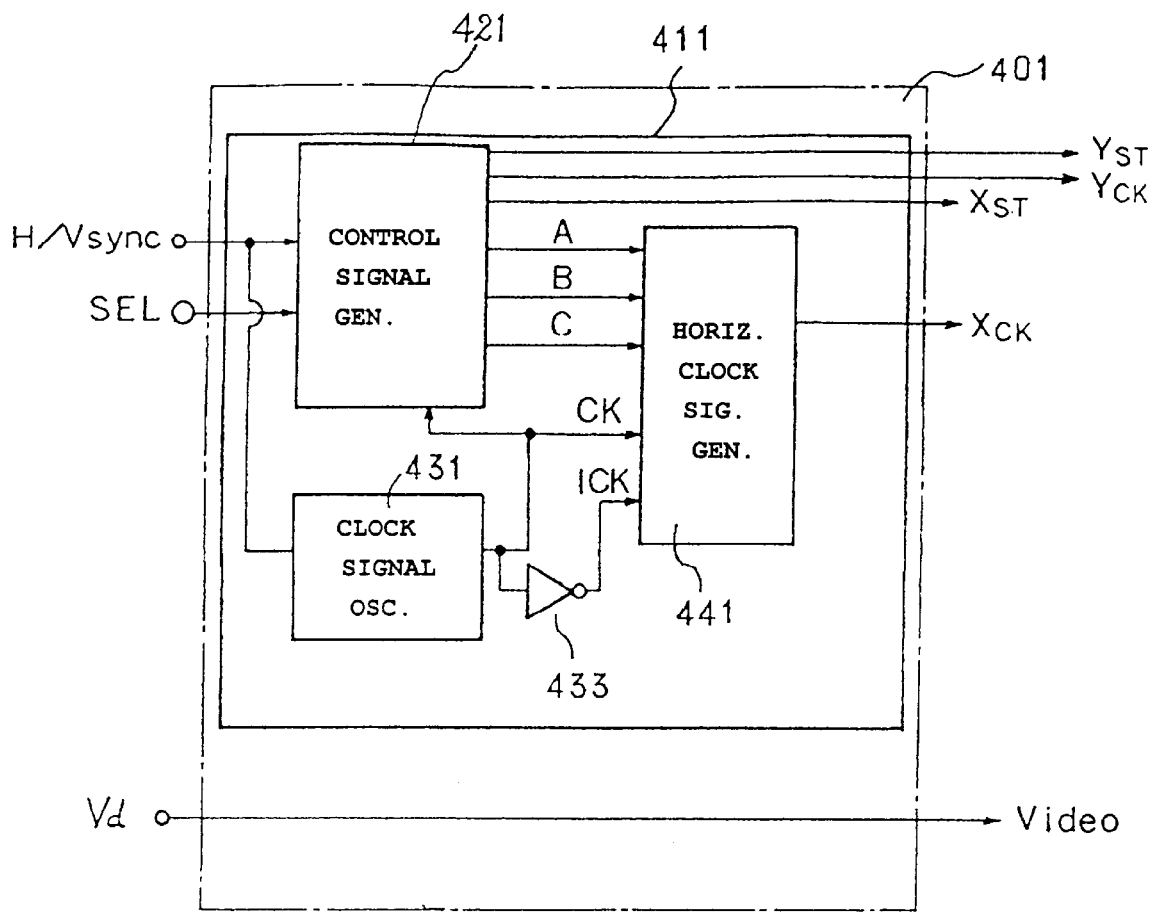
FIG. 5 is a block diagram of a control circuit shown in FIG. 1.

The control circuit 401 includes, as shown in FIG. 5, a horizontal clock signal control circuit 411 to output the horizontal clock signal "XCK" in accordance with a display area switching signal "SEL". The horizontal clock signal control circuit 411 is provided with a control signal generator 421 to generate control signals "A", "B", and "C" in response to a switching signal "SEL", a clock signal oscillator 431 consisted of a phase locked loop circuit, for instance, to generate a 14 MHz clock signal in response to the horizontal and vertical synchronous signals "H/Vsync", and a horizontal clock signal generator 441 (see FIG. 6) controlled with the control signals "A", "B", and "C", the reference clock signal "CK" and an inverted reference clock signal "ICK" inverted through an inverter 433.

Figures 6, 7:
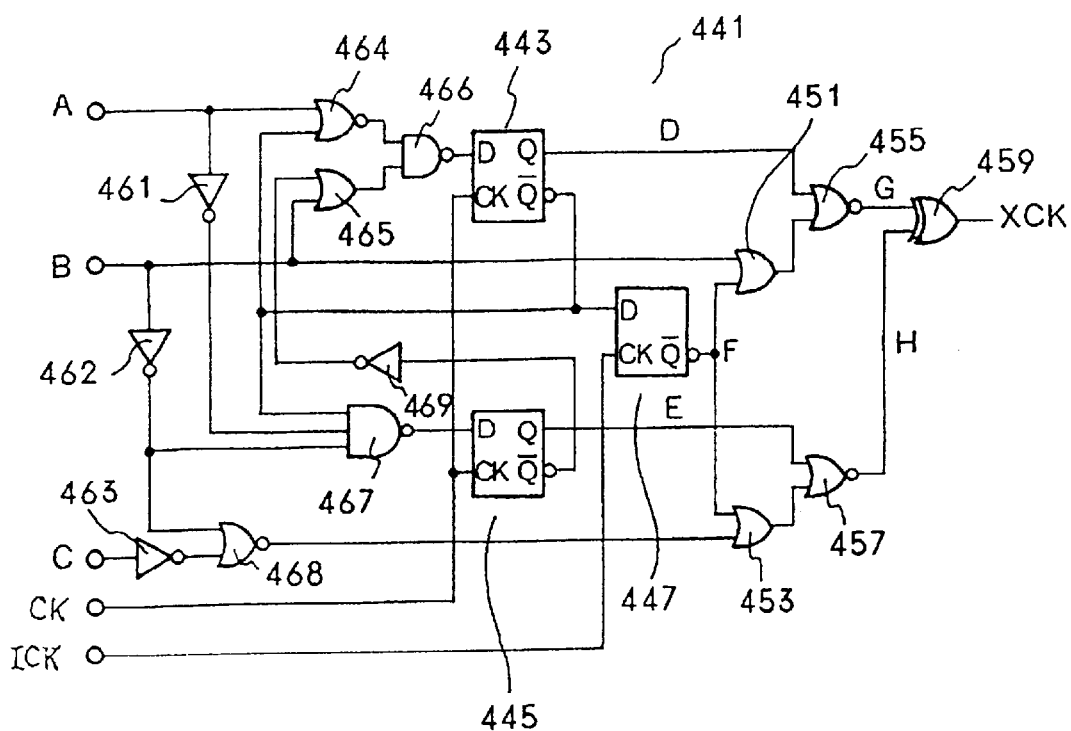
FIG. 6 is a circuit diagram of a horizontal clock signal generator in the control circuit.
FIG. 7 is a table to describe relationship between a control signal and frequencies of the horizontal clock signal.

The horizontal clock signal generator 441 will be next explained in detail with reference to FIG. 6. The control signal "A" and an output signal of a first flip-flop circuit 443 are supplied to a NOR gate 464 which, in turn, is supplied to a NAND gate 466. The control signal "B" and an output signal of an inverter 469 are supplied to an OR gate 465. The inverter 469 inverts an output signal Q of a second flip-flop circuit 445. The OR gate 465 supplies output signal to the NAND gate 466.

The first flip-flop circuit 443 is the clocked D type which has D and CK (clock) input terminals, and Q and Q output terminals. The flip-flop circuit is controlled in response to an output signal of the NAND gate 466 and the reference clock signal "CK" supplied to the D and CK clock input terminals, respectively. Its output signals Q (i.e., an output "D" shown in FIG. 8) and Q are provided to a NOR gate 455 and a D input terminal of a third flip-flop circuit 447, respectively. The output signal Q of the flip-flop circuit 443 is fed back to the NOR gate 464 and a NAND gate 467. The flip-flop circuit 447 is also the same clocked D type as of the flip-flop circuit 443. The flip-flop circuit 447 is controlled in response to an output signal Q of the flip-flop circuit 443 and the inverted reference clock signal "ICK" supplied to the D and CK input terminals thereof, respectively. An output Q (i.e., an output "F" shown in FIG. 8) of the flip-flop circuit 447 is supplied to OR gates 451 and 453.

The control signals "A" and "B" are supplied to the NAND gate 467 through inverters 461 and 462, respectively. An output signal of the NAND gate 467 and the reference clock signal "CK" are provided to D and CK input terminals of a second flip-flop circuit 445, respectively, which is the same type as of the other flip-flop circuits 443 and 447. Output signals Q (i.e., an output "E" shown in FIG. 8) and Q are provided to a NOR gate 457 and the OR gate 465 through an inverter 469, respectively.

Figure 8:
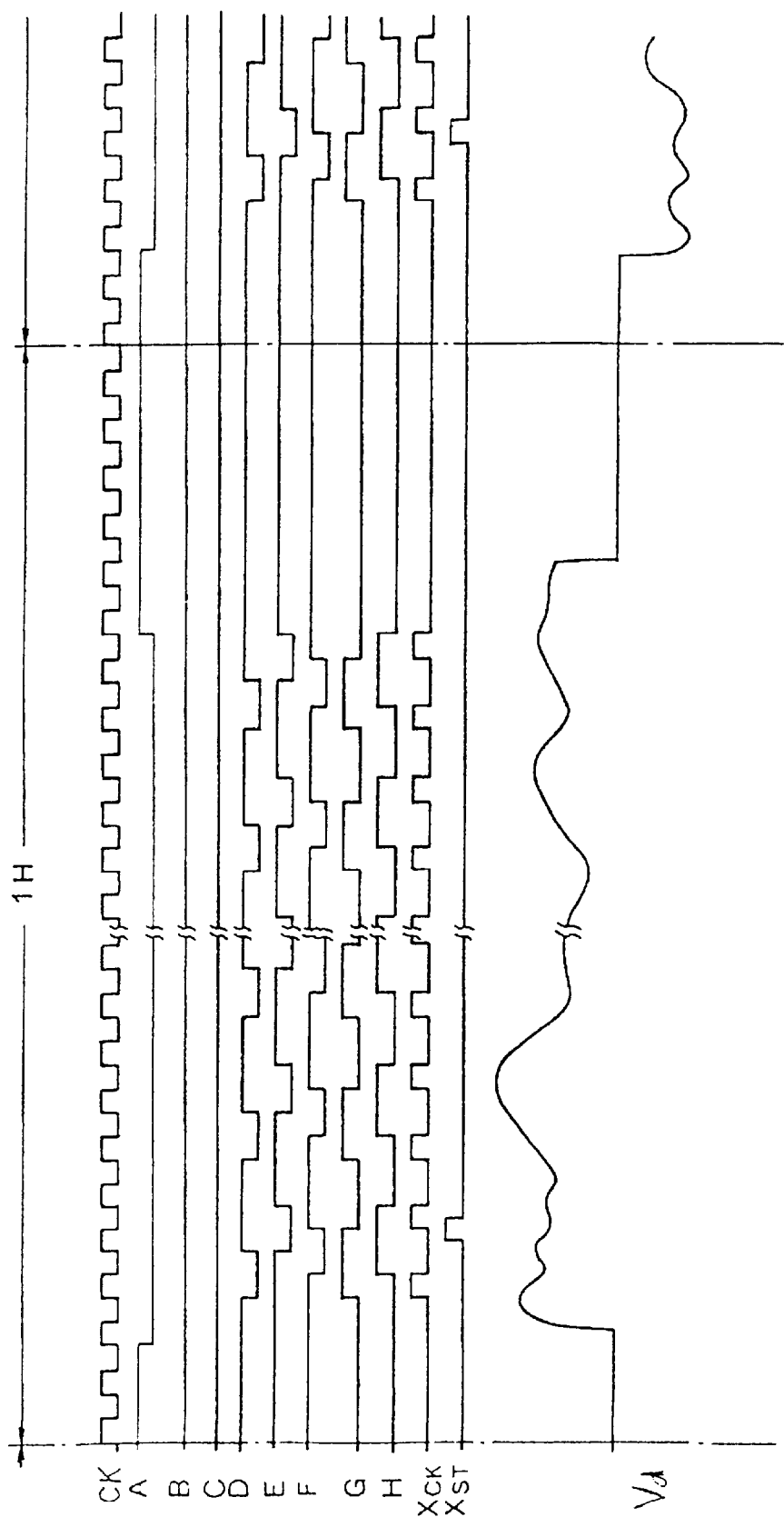
FIGS. 8 and 9 are diagrams of waveforms generated in the horizontal clock signal generator.

The control signal "B" is also supplied to the OR gate 451. An output signal of the OR gate 451 and the output signal Q of the flip-flop circuit 443 are provided to a NOR gate 455 which produces an output signal "G" shown in FIG. 8. The control signals "B" and "C" are supplied to a NOR gate 468 through inverters 462 and 463, respectively. An output signal of the NOR gate 468 is supplied to the OR gate 453 which also receives the output signal Q of the flip-flop circuit 447. An output signal of the OR gate 453 is supplied to the NOR gate 457 which also receives the output signal Q of the flip-flop circuit 445. The NOR gate 457 produces an output signal "H" shown in FIG. 8. The output signals "G" and "H" of the NOR gates 457 are supplied to an EXOR (Exclusive OR) gate 459 to form an output signal "XCK" as shown in FIG. 8.

The control signal "A" controls an output period of the horizontal clock signal "XCK" of the horizontal clock signal generator 441. The control signal "B" and "C" control a frequency of the horizontal clock signal "XCK" of the horizontal clock signal generator 441 in such a manner as shown in FIG. 7. When the control signal "B" is a high level (H) and that "C" is either a high (E) or low (L) level, the horizontal clock signal generator 441 generates the horizontal clock signal "XCK" with the frequency of "2fCK/3" where the "fCK" is a frequency of the reference horizontal clock signal "CK". In the case that the control signals "B" and "C" are high (H) and low (L) levels, respectively, the horizontal clock signal generator 441 derives the horizontal clock signal "XCK" with that of "fCK". Further, in the case that the control signals "B" and "C" are high (E) levels, the horizontal clock generator 441 outputs the horizontal clock signal "XCK" with that of "fCK/2".

The frequency "fCK" of the reference horizontal clock signal "CK" is determined by a product of a horizontal scanning frequency and the number of horizontal dots. In the case of this embodiment, since the NTSC horizontal scanning frequency (fH) is 15.734 kHz, each of the pixels of red (R), green (G), and blue (B) has 480 dots per a horizontal scanning line, and the ratio of an effective video signal for each scanning period is about 8/10, the frequency "fCK" of the reference clock signal "CK" is derived out from an equation of {(fH)×[480/(8/10)]}×2/3, i.e., approximately 14 MHz. When the display device receives PAL video signals, however, the frequency of its clock signal is adjusted in accordance with the PAL horizontal scanning frequency and the number of horizontal dots used therefor in substantially the same way as set forth above.

Operation of the liquid crystal display device 1 will be described hereinafter. First, it is set forth in the case that the liquid crystal display device 1 displays on the display area 103 a video signal "Vd" consisting of image information with the aspect ratio of 16/9 or 4/3 as shown in FIG. 13(*b*).

The clock signal oscillator circuit 431 of the control circuit 401 generates the reference clock signal "CK" with the frequency of 14 MHz. The clock signal "CK" and the inverted reference clock signal "ICK" inverted through the inverter 433 are provided to the horizontal clock signal generator 441.

The control signal generator 421 is provided with the reference clock signal "CK", the selection signal "SEL", and the horizontal/vertical synchronous signal "H/Vsync" to generates the horizontal start signal "XST", and the control signals "A","B", and "C" which are in turn provided to the horizontal clock signal generator 441.

In response to the control signals, the flip-flop circuit 443 of he horizontal clock signal generator 441 outputs a divided reference clock signal "CK/3" as the signal "D" which duty ratio of a high level to a low level is 1:2. The flip-flop circuit 445 outputs the signal "E" consisting of the signal "D" but delayed by one clock period in accordance with the reference clock signal "CK". The flip-flop circuit 447 derives out the signal "F" consisting of the signal "D" but delayed by ½ clock period.

The NOR gate 455 outputs the signal "G" which is a divided reference clock signal "CK/3" and which duty ratio of a high level to a low level is 1:1 in response to the signal "D", and the output signal of the OR gate 451 consisting of the control signal "B" and the signal "F". Controlled by the output signal of the OR gate 453 consisting of low (L) level signals derived from the control signals "B" and "C" and the signal "F", and the signal "E", the NOR gate 457 outputs the signal "H", which is a divided reference clock signal "CK/3" and is delayed in phase by ½ clock period with respect to the signal "G". In response to the input signals "G" and "H", the EXOR 459 outputs the horizontal clock signal "XCK" consisting of a divided reference clock signal "2CK/3" with the frequency of "2fCK/3" which duty ratio of a low level to a high level is 2:1 (see various waveforms shown in FIG. 8).

In accordance with the horizontal clock signal "XCK", the input video signal "Vd" is sampled at 480 points for each color of every one horizontal period (1H) and is reconstructed on the display area 103 as image information with the aspect ratio of 16/9.

Next, the operation of the liquid crystal display device 1 is further described in the case that the display area is divided into two display regions, i.e., a first region A with the aspect ratio of 12/9 (=4/3) and a second region B with that of 4/9 and an NTSC video signal with the aspect ratio of 4/3 is displayed on the first region A.

Figure 9:
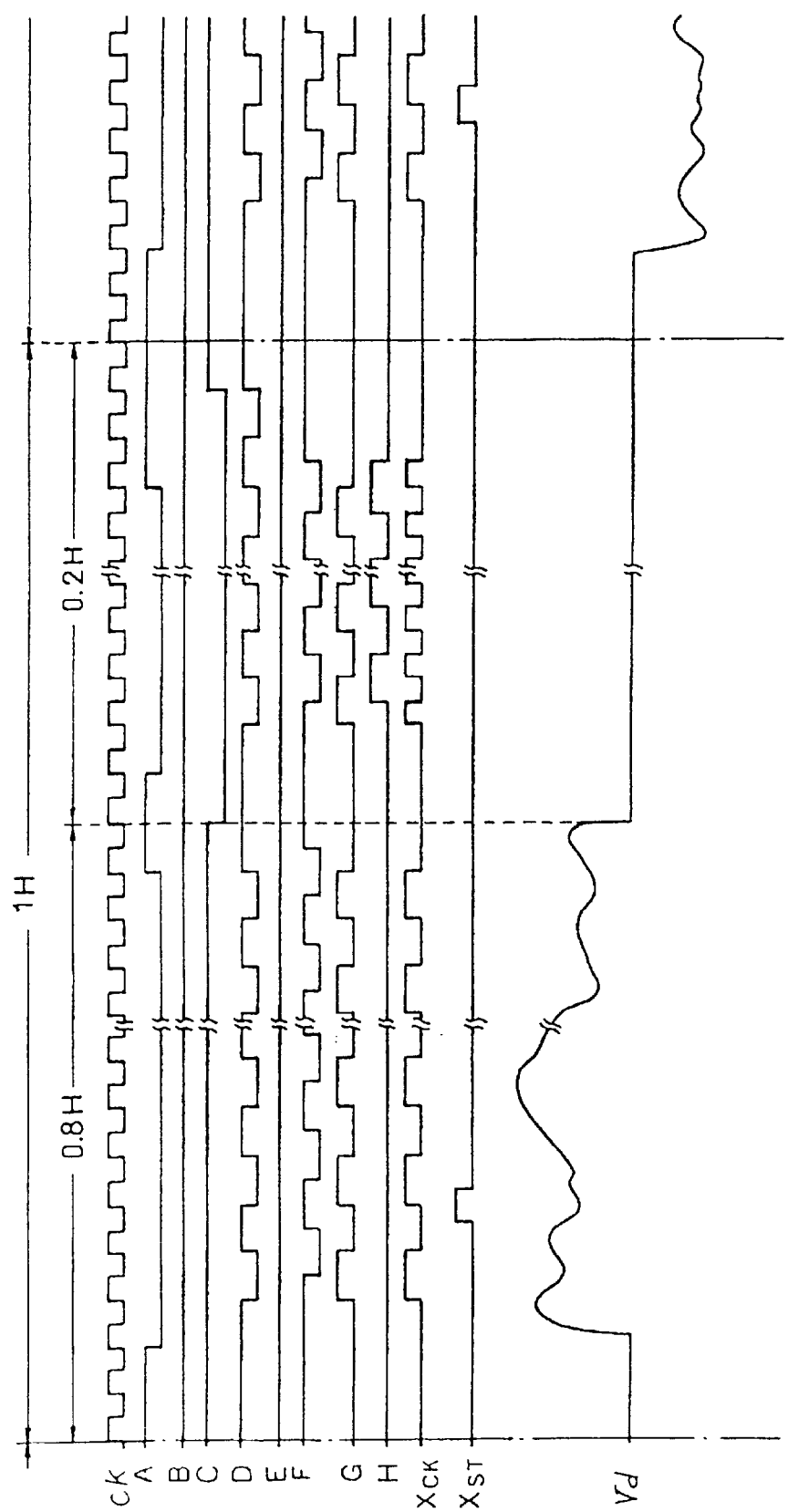

In this particular case, as shown in FIG. 9, one video signal "Vd" corresponding to the first region with the aspect ratio of 4/3 is sampled during 0.8 H for each horizontal scanning period H and another video signal corresponding to the second region B with that of 4/9 is sampled during the remaining horizontal scanning period of 0.2 H. The latter video signal is set to display an entire black display, for instance, on the second region B in the case.

The control signal generator 421 outputs high level control signals "B" and "C" during 0.8 H in accordance with the selection signal "SEL" so that the clock pulse signal "XCK" with the frequency of fCK/2. In the horizontal clock signal generator 441, the flip-flop circuit 443 outputs the signal "D" consisting of a divided reference clock signal "CK/2" with the phase shift of 180° from the reference clock signal "CK". The flip-flop circuit 445 outputs the signal "E" with a high level (H) when the control signals "A" and "B" are a low level. The flip-flop 447 provides the signal "F" consisting of the signal "D" delayed by ½ clock period on a basis of the reference clock signal "CK". The NOR gate 455 is provided with the signal "D", and the outputs of the OR gate 451 consisting of the control signal "B" and the signal "F" to produce the signal "G" consisting of the signal "D" but shifting the phase of 180° therefrom. The NOR gate 457 outputs a low level signal "H" in accordance with the signal "E" and the output signal of the OR gate 453 which is provided with the signal "F" and high level signals based on the control signals "B" and "C". The EXOR gate 459 outputs the horizontal clock signal "XCK" consisting of a divided reference clock signal "CK/2" with the duty ratio of a low level to a high level of 1:1.

The video signal "Vd" corresponding to the first region A with the aspect ratio of 4/3 is sequentially sampled in accordance with the horizontal clock signal "XCK" during the period of 0.8 H.

As shown in FIG. 9, the control signal "C" is set to be a low level and the horizontal clock signal "XCK" with the same frequency "fCK" as of the reference clock signal "CK" is derived out from the horizontal clock signal generator 441.

In this case, the flip-flop circuit 443 outputs the signal "D" consisting of a frequency divided clock signal "CK/2" with the phase shift of 180° from the reference clock signal. The flip-flop circuit 445 produces the signal "E" with the high level in the case of the control signals "A" and "B" with the low level. The flip-flop circuit 447 provides the signal "F" consisting of the signal "D" delayed by a half of one clock period in accordance with the reference clock signal "CK". The NOR gate 455 is provided with the signal "D" and the output of the OR gate 451 and outputs the signal "G" consisting of the signal "D" but shifting the phase of 180° therefrom. The NOR gate 457 receives the signal "E" and the output of the OR gate 453, which is provided with the signal "F" and a low level signal concerning the control signals "B" and "C", and outputs the signal "H" consisting the signal "F" but shifting the phase of 180° therefrom. The EXOR gate 459 produces the horizontal clock signal "XCK" with the same frequency "fCK" as of the reference clock signal "CK" in response to the signals "G" and "H".

The video signal "Vd" corresponding to the second region with the aspect ratio 4/9 is sampled in accordance with the clock signal "XCK" during the remaining period of 0.2 H. As set forth above, the video signal "Vd" consisting of image information with the aspect ratio of 4/3 is displayed on the first region A with the same aspect ratio as thereof within one horizontal scanning period by changing the frequency of the horizontal clock signal.

According to the liquid crystal display device 1, such display forms as shown in FIGS. 13(*b*) and 13(*c*) can be performed by merely changing the frequency of the horizontal clock signal. It is unnecessary to use an expensive memory for the display device.

Further, the unique structure of the control circuit enables the reference clock signal to be a lower frequency. It provides, therefore, various features in which it is quite little affected by outer circuits, generates reliably the horizontal clock "XCK" and achieves low power consumption. In addition, a lower frequency reference horizontal clock signal can suppress spurious electromagnetic waves.

A liquid crystal display device of another embodiment of the invention will be further explained hereinbelow with reference to the drawings. The liquid crystal display device 1 of the embodiment can carry out a display as shown in FIG. 13(*d*) in addition to those explained above.

Figure 10:
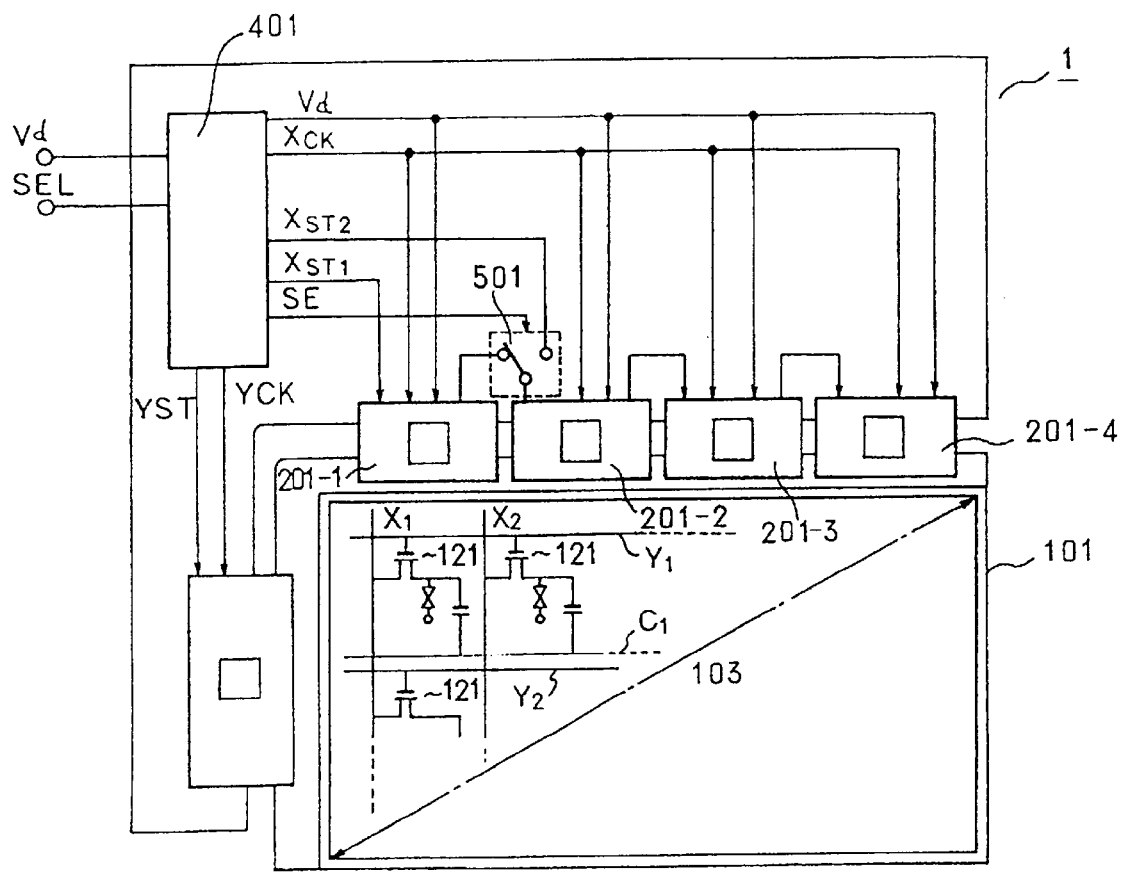
FIG. 10 is a schematic diagram to show a liquid crystal display device of another embodiment of the invention.
Figure 11:
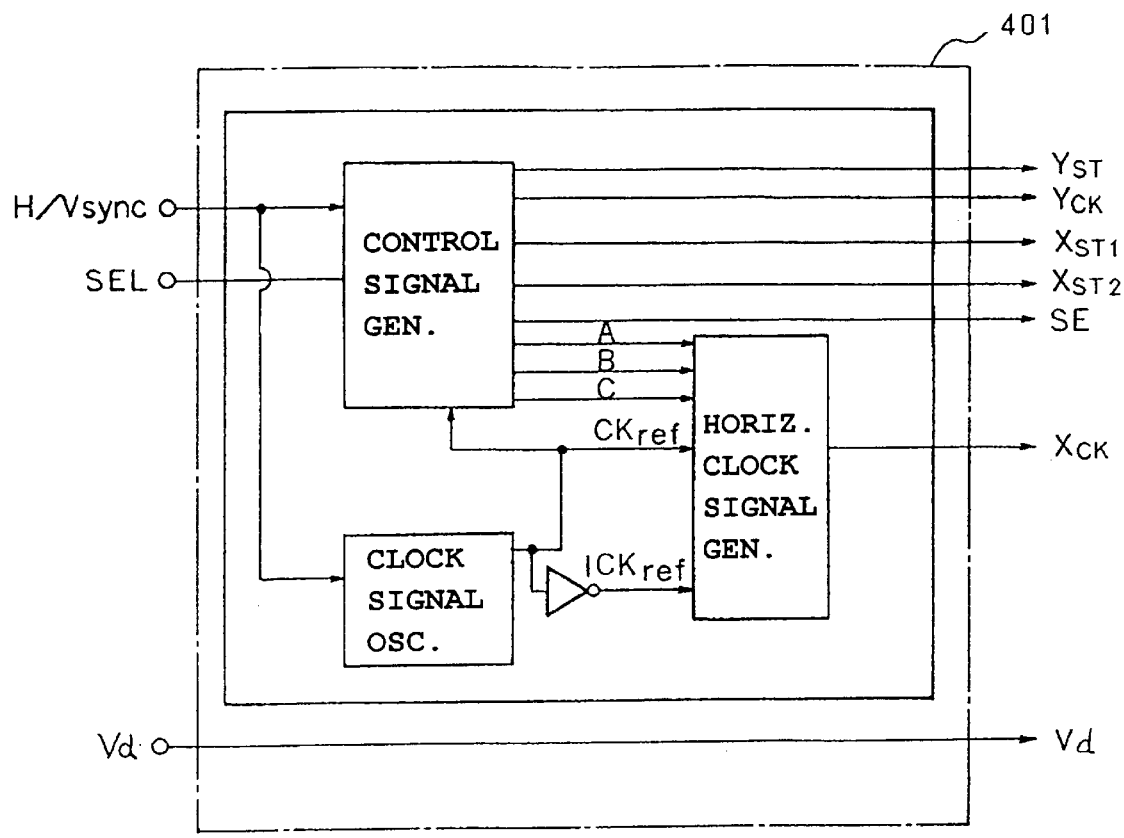
FIG. 11 is a block diagram of a control circuit shown in FIG. 10.

As shown in FIGS. 10 and 11, the display device 1 is substantially the same in structure as in the first embodiment but, additionally, a switching circuit 501 is provided between the X-driver circuits 201-1 and 201-2, and the control circuit 401 outputs horizontal start signals "XST1", "XST2" and a switching signal "SE" to control the switching circuit 501. In short, the switching circuit 501 couples either the horizontal start signal "XST1" of the final stage flip-flop circuit of the X-driver circuit 201-1 to the X-driver circuit 201-2 or the horizontal start signal "XST2" of the control circuit 401 to the X-driver circuit 201-2 in response to a switching signal "SE" of the control circuit 401.

Based on such structure and additional functions, the operation of the liquid crystal display device 1 will be described first with respect to the display of an NTSC video signal "Vd" consisting of image information with the aspect ratio 16/9 (or 4/3) on the display area 103 as shown in FIG. 13(*b*).

In this particular case, the switching circuit 501 is selected to connect the X-driver circuit 201-1 to the X-driver circuit 201-2 in response to the switching signal "SE" so that the horizontal start signal "XST1" is supplied from the final stage of the X-driver circuit 201-1 to the first stage of the X-driver circuit 201-2. In other words, the X-driver circuits 201-1 through 201-4 coupled together in cascade.

In the same manner as in the first embodiment, the control circuit 401 outputs the horizontal clock signal "XCK" derived from the reference clock signal "CK". The frequency thereof is "2fCK/3" where the frequency "fCK" of the reference clock "CK" is about 14 MHz. The duty ratio of clock signal "XCK" is 2:1 where that is defined by a ratio of a low level to a high level of the clock signal "XCK".

The video signal "Vd" is sampled in accordance with the clock signal "XCK" to display image information with the aspect ratio of 16/9 on the display area 103 of the display device 1 in which the number of such sampling is 480 for each color at every horizontal scanning line.

The display device 1 further operates in such a way that the display area 103 is divided into the region A with the aspect ratio of 12/9 (=4/3) and the region B that of 4/9 as shown in FIG. 13(*c*) and an NTSC video signal "Vd" consisting of image signal with the aspect ratio of 4/3 is displayed on the region A.

In this case, switching circuit 501 is also selected to connect the X-driver circuit 201-1 to the X-driver circuit 201-2 in response to the switching signal "SE" so that the first horizontal start signal "XST1" is supplied from the final stage of the X-driver circuit 201-1 to the first stage of the X-driver circuit 201-2 and the X-driver circuits 201-2, 201-3, and 201-4 are connected each other in cascade.

In the same manner as set forth above, the control circuit 401 outputs the horizontal clock signal "XCK" with the frequency of fCK/2 to sample the video signal "Vd" corresponding to the region A with aspect ratio of 4/3 during the period 0.8 H. The control circuit 401 outputs the horizontal clock signal "XCK" with the frequency of fCK during the remaining period of 0.2 H. The whole sampling of all the pixels is thus completed for one horizontal scanning line. The video signal "Vd" consisting of image information with the aspect ratio of 4/3 is displayed on the region A without any aspect change.

The display device 1 also carries out such a display as shown in FIG. 13(*d*) in which the display area 103 is divided into the region A with the aspect ratio of 4/9 and the region B with that of 12/9 (=4/3) and an NTSC video signal "Vd" consisting of image information with the aspect ratio of 4/3 is displayed on the region B.

Figure 12:
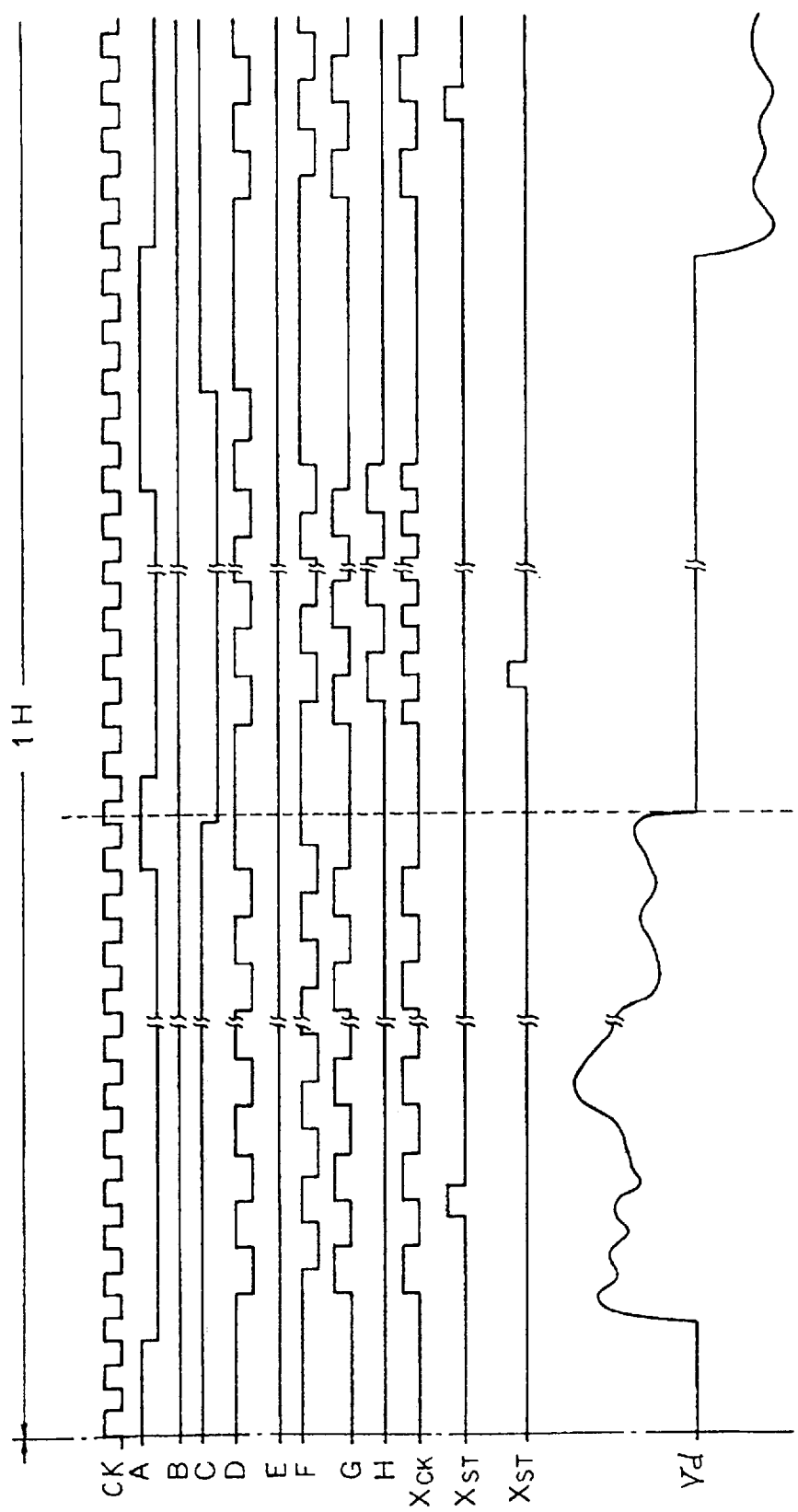
FIG. 12 is a block diagram of waveforms generated by a horizontal clock signal generator shown in FIG. 10.

The switching circuit 501 is selected to couple the horizontal start signal "XST2" of the control circuit 401 to the X-driver circuit 201-2 in response to the switching signal "SE". The control circuit 401 outputs the horizontal clock signal "XCK" with the frequency of "fCK/2" to sample the video signal "Vd" corresponding to the region B with the aspect ratio of 4/3 during the period of 0.8 H within one horizontal scanning period (1H) as shown in FIG. 12. The X-driver circuits 201-2 through 201-4 complete the sampling of the video signal "Vd" in response to the horizontal start signal "XST2" and the clock signal "XCK". The control circuit 401 outputs the horizontal clock signal "XCK" with the frequency of "fCK". The X-driver circuit 201-1 samples the video signal "Vd" corresponding to the region A in accordance with the horizontal start signal "XST1" and the horizontal clock "XCK" during the remaining period of 0.2 H. Thus, the sampling is completed for all the pixels for one horizontal scanning line (1H). In this way, the video signal "Vd" consisting of image information with the aspect ratio of 4/3 is displayed on the region B with the aspect ratio of 4/3 with no aspect change.

As described above, the liquid crystal display device 1 can display the video signal as shown in FIG. 13(*d*) in addition to such other display forms as explained in the first embodiment.

The present invention is not limited to the specific embodiments. The video signal "Vd" is based on not only the NTSC system but also other various systems. The display area may be divided into a few effective display regions on which a few different video signals may be displayed, respectively. Further, the active matrix type liquid crystal display device 1 includes TFTs connected to the pixels but metal insulator metal switching elements (MIMs) may be in place thereof.

According to an image display method and an apparatus of the present invention, image information with different aspect ratios can be displayed on a few display areas with desired aspect ratios in a less expensive, accurate way.

What we claim is:

1. An image display device for displaying information on a display screen having a predetermined aspect ratio in response to an input reference clock signal, comprising:
    a display screen having a plurality of horizontal pixel lines, each of which has a plurality of display pixels;
    a horizontal scanning circuit to sample video signals corresponding to the display pixels in each horizontal scanning period based on a sampling clock signal and output the signal voltages to the display pixels, respectively; and
    a control circuit to output the sampling clock signal based on the input reference clock signal, said control circuit including
    a digital divider circuit to multiply the reference clock signal by one of first and second dividing ratios in each horizontal scanning period, and
    a switching circuit to select the sampling clock signal from the product of the reference clock signal multiplied by the first dividing ratio in each horizontal scanning period and the product of the reference clock signal multiplied by the second dividing ratio in each horizontal scanning period.

2. The image display device according to claim 1, wherein the predetermined aspect ratio of the screen is 16/9.

3. The image display device according to claim 2, wherein the first dividing ratio of said divider circuit is 1/2 in such a case that the video signal includes the aspect ratio of 4/3.

4. The image display device according to claim 2, wherein the second dividing ratio of said divider circuit is 2/3 in such a case that the video signal includes the aspect ratio of 16/9.

5. The image display device according to claim 1, wherein said divider circuit carries out dividing operation at the rising up and falling down edges of the reference clock signal.

6. The image display device according to claim 1, wherein said divider circuit includes a divider to multiply the reference clock signal by a dividing ratio of 1/3, a delay circuit to delay an output of the divider by twice the period of the reference clock signal, and a generator to generate an output signal which is a 2/3 divided signal of the reference clock signal in response to the rising up and falling down edges of outputs of said divider and said delay circuit.

7. A method of displaying an image on a display screen with a predetermined aspect ratio of a lateral axis length to a longitudinal axis length comprising:
    outputting from a control circuit a sampling clock signal based on a reference clock signal;
    sampling a video signal containing the image in accordance with the sampling clock signal;
    providing the sampled video signal to pixels of horizontal pixel lines on said display screen;
    multiplying a reference clock signal by one of first and second dividing ratios with a digital divider circuit; and
    selecting the sampling clock signal from the product of the reference clock signal multiplied by the first dividing ratio within one horizontal scanning period and the product of the reference clock signal multiplied by the second dividing ratio.

8. The method of displaying an image on a display screen according to claim 7, wherein said display screen has an aspect ratio of 16/9 defined by its lateral axis length to its longitudinal axis length.

9. The method of displaying an image on a display screen according to claim 8, wherein the first dividing ratio is 1/2 in such a case that the video signal includes the image information with an aspect ratio of 4/3 defined by its lateral axis length to its longitudinal axis length.

10. The method of displaying an image on a display screen according to claim 9, wherein the second dividing ratio is 2/3 in such a case that the aspect ratio of the video signal is 16/9.

11. A method of displaying an image on a display screen with a predetermined aspect ratio of a lateral axis length to a longitudinal axis length comprising:
    a first step for outputting from a control circuit a sampling clock signal based on a reference clock signal and for sampling a video signal containing the image in accordance with the sampling clock signal;
    a second step for providing an output signal of said first step to pixels of horizontal pixel lines on said display screen;
    a third step for multiplying a reference clock signal by one of first and second dividing ratios with a digital divider circuit; and
    a fourth step for selecting the sampling clock signal from the product of the reference clock signal multiplied by the first dividing ratio within one horizontal scanning period and the product of the reference clock signal multiplied by the second dividing ratio.

12. The method of displaying an image on a display screen according to claim 11, said third step carries out dividing in accordance with rising up and falling down edges of the reference clock signal.

13. The method of displaying an image on a display screen according to claim 11, wherein said third step carries out a division of the reference clock signal in accordance with a dividing ratio of 1/3, delays a 1/3 divided signal of the reference clock signal by twice the period of the reference clock signal, and generate a 2/3 divided signal of the reference clock signal in accordance with the rising up and falling down edges of the 1/3 divided signal and the delayed signal.

14. An image display device for displaying information on a display screen having a predetermined aspect ration in response to an input reference clock signal, comprising:

a display screen having a plurality of horizontal pixel lines, each of which has a plurality of display pixels;

a control circuit to output a sampling clock signal based on the input reference signal; and a horizontal scanning circuit to sample video signals corresponding to the display pixels in each horizontal scanning period based on the sampling clock signal and output the signal voltages to the display pixels, respectively;

wherein the control circuit includes a digital divider circuit to multiply the reference clock signal by first or second dividing ratios in each horizontal scanning period, and a switching circuit to seclect either a combination of the reference clock signal and an output signal of said digital divider circuit multiplied by the first dividing ratio in each horizontal scanning period or an output signal of said divider circuit mulitplied by the second dividing ratio in each horizontal scanning period.

\* \* \* \* \*

UNITED STATES PATENT AND TRADEMARK OFFICE
CERTIFICATE OF CORRECTION

PATENT NO. : 6,008,789

DATED : December 28, 1999

INVENTOR(S): Kimio ANAI et al.

It is certified that an error appears in the above-identified patent and that said Letters Patent is hereby corrected as shown below:

On the title page, item [30], the 2nd Foreign Application Priority Data is not claimed and should be omitted. The Foreign Application Priority Data should read as follows:

--[30] Foreign Application Priority Data

Sep. 11, 1996   [JP]   Japan............8-240317--

Signed and Sealed this

Twenty-fourth Day of April, 2001

*Attest:*

NICHOLAS P. GODICI

*Attesting Officer*   *Acting Director of the United States Patent and Trademark Office*